United States Patent
Mikan

[11] Patent Number: 6,130,424
[45] Date of Patent: Oct. 10, 2000

[54] FIBER OPTIC CONTROL WITH POSITIVE MECHANICAL DRIVE FROM JOY STICK

[76] Inventor: Peter J. Mikan, 31 Greenfield Rd., Milford, Conn. 06460

[21] Appl. No.: 09/309,437

[22] Filed: May 11, 1999

[51] Int. Cl.[7] .................................................. G01J 1/36
[52] U.S. Cl. ...................... 250/227.22; 250/221; 341/22
[58] Field of Search ................. 250/227.22, 227.21, 250/227.23, 227.14, 227.29, 231.1, 221; 385/8, 16, 17, 18; 273/148 R, 150; 341/22, 31

[56] References Cited

U.S. PATENT DOCUMENTS 4,044,856  8/1977  Stevenson .......................... 250/227.22

*Primary Examiner*—Que T. Le
*Attorney, Agent, or Firm*—S. Pal Asija; H. Gibner Lehmann; K. Gibner Lehmann

[57] ABSTRACT

Disclosed is a fiber optic control device having a joy stick, a housing which mounts the joy stick for universal pivotal movement on the housing from an upright axis thereof, a pair of mirrors which are movably mounted on the housing, driving connections between the joy stick and the mirrors, for actuating the latter in response to movement of the joy stick, a cooperable movement-limiting device on said joy stick and housing, enabling said universal pivotal movement of the joy stick to be had while preventing its rotative movement about the longitudinal axis thereof, and fiber-optic light transmission devices that are cooperable with the mirror and that can include sources of light which are adapted to direct light beams against portions of the mirrors, for providing output light signals in optical cables, which are a function of the virtual position of the joy stick.

17 Claims, 1 Drawing Sheet

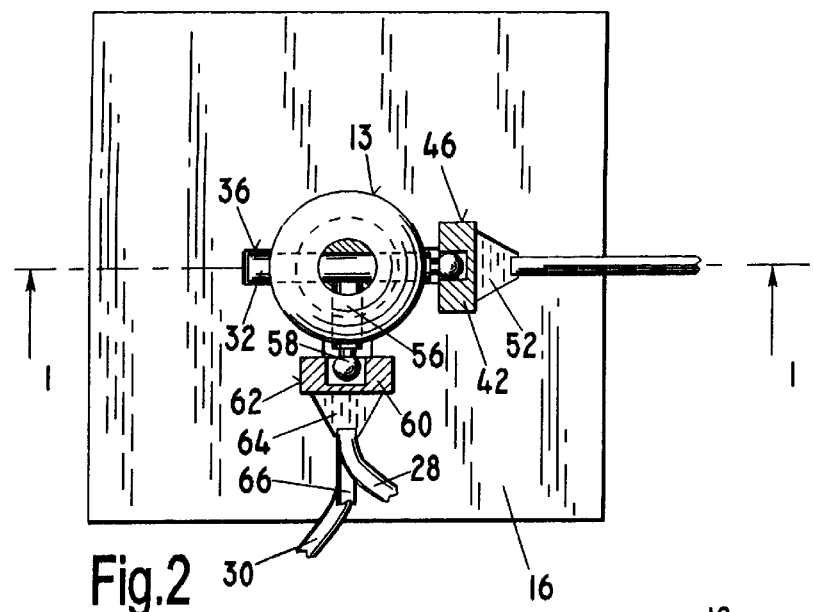
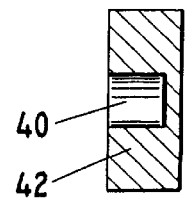
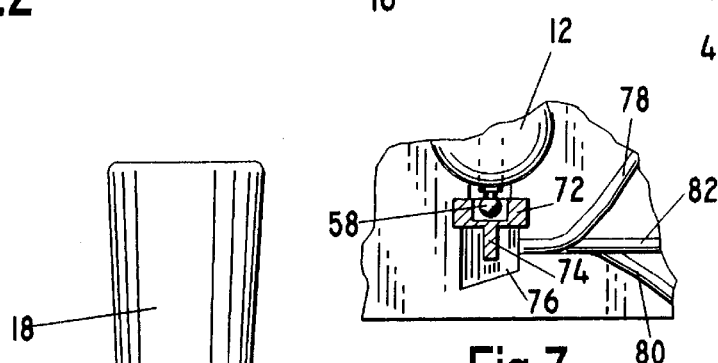
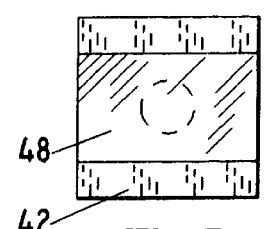
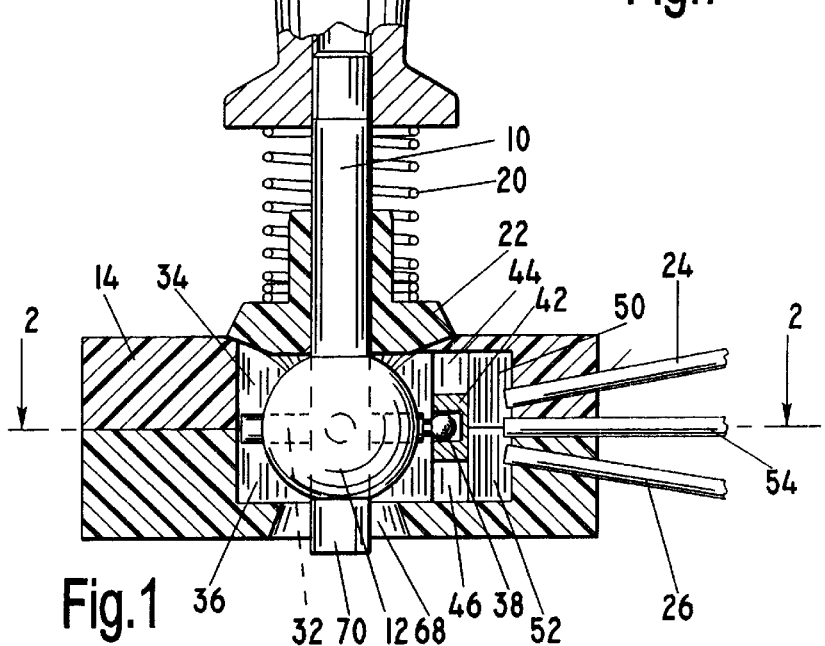
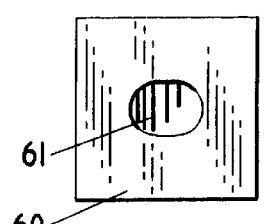

FIBER OPTIC CONTROL WITH POSITIVE MECHANICAL DRIVE FROM JOY STICK

CROSS REFERENCES TO RELATED APPLICATIONS

U.S. patent application Ser. No. 09/251,780 filed Feb. 17, 1999 in the name of Peter J. Mikan and entitled "Fiber Optic Control With Joy Stick".

STATEMENT AS TO RIGHTS TO INVENTIONS MADE UNDER FEDERALLY-SPONSORED RESEARCH AND DEVELOPMENT.

Research and development of the present invention and application have not been Federally-sponsored, and no rights are given under any Federal program.

BACKGROUND OF THE INVENTION

1. Field of the Invention

This invention relates generally to joystick devices of the kind having a swivel mounted manually-engageable lever capable of movement from a center position to any one of a number of angular positions lying within a theoretical upwardly-extending conical surface, for controlling the operation of various types of electronic or electromechanical equipment.

2. Description of the Related Art Including Information Disclosed Under 37 CFR §§1.97-1.99

The following references are hereby cited as being representative of some of the known prior art in the field to which the present invention pertains:

U.S. Pat. Nos.: 4,459,022 4,686,361 4,731,530

U.S. Pat. No. 4,459,022 discloses a fiber optic angular sensor wherein a mirror is carried by a joystick so as to have universal movement as the joystick is manipulated. An optical cable having five fibers is brought in to cooperate with the mirror. One cable directs a light beam against the mirror to be reflected thereby, and the remaining four cables pick up reflected light from the mirror and carry the same to a light responsive control, from which functions are obtained to operate various pieces of equipment. Constructional details as to the configuration of the various components are not given, and thus no value can be placed on any advantages relating to carrying out or reducing the invention to actual physical practice.

U.S. Pat. No. 4,686,361 also discloses a mirror surface carried by the joystick of a fiber optic control. In this patent the control stick is hollow and includes a movable inner member having an aperture for the transmission of radiant energy to control a switching function. The bottom surface of the pivot ball is flatted and made reflective for the purpose of fiber optic control, and thus limitations exist as to the mounting and full use of the ball. Here again, no details are given as to the actual structural configurations of the various components, and therefore any advantages thereof must be assumed in carrying out the physical details of the control.

In U.S. Pat. No. 4,731,530 a joystick operates sector members which have a varied transparency. Light beams are directed against the sectors and pass through the same with varying degrees of intensity, in the manner of a filter. These filtered beams are utilized by means of electronic circuitry to effect control functions for operating different pieces of equipment. The sector members require careful preparation as to the gradations of transparency, and such operation requires a certain degree of quality control, involving accompanying expense.

Thus, while the foregoing patents disclose fiber optic cables in connection with joystick controls, they have limitations as pointed out above. The above disadvantages and drawbacks of the prior patents are obviated by the present invention, and one object of the invention is to provide a novel and improved fiber-optic joystick control having relatively few components which can be economically fabricated and assembled so as to produce a very low cost control unit.

Another object of the invention is to provide an improved fiber optic control device of the type above set forth, which is especially reliable and fool-proof in its operation.

A further object of the invention is to provide an improved fiber optic/joystick control as above characterized, wherein the number of moving parts is few, and wherein such parts can be readily mass produced.

An additional object of the invention is to provide an improved fiber optic/joystick control device as outlined above, which is especially small and compact, requiring but little space in addition to that required by the hand-operated lever-type joystick.

A feature of the invention is the provision of an improved fiber optic control in accordance with the foregoing, wherein an extremely simple, positive mechanical drive is effected from the joy stick to movable fiber optic control members of the device.

In accomplishing the above objects and advaantages the invention provides a fiber optic control device comprising a joy stick mounted on
a housing for universal pivotal movement from an upright axial position thereof, a pair of mirrors which are linearly movably mounted on the housing, direct driving connections between the joy stick and the mirrors for actuating the latter in response to movements of the joy stick, cooperable movement-limiting means on said joy stick and housing, enabling said universal pivotal movement of the joy stick to be had while preventing its rotative movement about the longitudinal axis thereof, and fiber-optic light transmission means cooperable with the mirrors and including sources of light adapted to direct light beams against portions of said mirrors for providing output light signals in optical cables, which are a function of various virtual positions of the joy stick.

BRIEF DESCRIPTION OF THE DRAWINGS

Other features and advantages will hereinafter appear.

In the accompanying drawings:

FIG. 1 is an axial sectionalview of the improved fiber optic control of the invention, taken on the line 1—1 of FIG. 2.

FIG. 2 is a horizontal sectional view of the control, taken on the line 2—2 of FIG. 1.

FIG. 3 is a sectional view of one of the mirror elements of the control, taken on the line 3—3 of FIG. 4.

FIG. 4 is an inside elevational view of the mirror element of FIG. 3.

FIG. 5 is an outside elevational view of the mirror element of FIG. 4.

FIG. 6 is an inside elevational view of another mirror element for the control, illustrating that portion thereof which is involved with another axis of movement or actuation of the equipment, and FIG. 7 is a fragmentary detail of the showing of FIG. 2, illustrating another embodiment of the invention wherein both sets of fiber optic cables can exit from the housing 14, 16 at the right side thereof as viewed in the figures, making for a smaller and more compact assemblage at the lower portion of the joystick.

DETAILED DESCRIPTION OF THE DRAWINGS

Referring first to FIGS. 1–5, the improved fiber optic control of the invention comprises a joy stick 10 having adjacent its lower end a swivel ball which is carried in a socket provided by upper and lower superposed housing members 14 and 16 respectively. The joy stick 10 has an operating handle or knob 18 under which there is a centralizing spring 20 engaging a slidable collar 22 that rests in a conical depression of the upper housing member 14 to normally keep the joystick 10 in an upright position as shown in FIG. 1.

Tilted positions of the joystick 10 are utilized to provide fiber optic or light signals in sets of optical cables that are brought in to the housing 14, 16. Considering specifically optical signals in cables 24 and 26 which extend from the right side of the housing 14, 16 as seen in FIGS. 1 and 2, and also in optical cables 28 and 30 which extend from the lower side of the housing 14, 16 as seen in FIG. 1.

The invention also provides simple means for preventing any turning movement of the joystick 10 about its axis, such means also constituting part of the structure by which the optical signals are produced in the cables 24 and 26. To effect this, a transverse pin or shaft 32 is disposed in the ball 12 along a orizontal diameter thereof, as seen in FIG. 1, one end of the pin 32 extending from the ball into a vertical guide formed by aligned slots 34 and 36 located respectively in the upper and lower halves 14 and 16 of the housing. Thus movement of the joystick 10 is restricted to a tilting movement only by the pin 32 and the socket 13 of the housing parts 14 and 16.

In accordance with the invention the tilting movements of the joystick are utilized to produce optical pulses or signals in the cables 24, 26, 28 and 30 in a unique manner by especially simple structures which not only have few and inexpensive components but which are particularly rugged and reliable in their operation.

As seen in FIGS. 1 and 2, the other end of the pin 32 projects from the opposite side of the ball 12 and carries a ball 38 which is received in a socket 40 of a mirror member 42 which is vertically slidable in aligned slots 44 and 46 of the housing parts 14, 16. The member 42 has on its outer surface a reflecting bar or mirror 48 which is exposed to recesses 50 and 52 that are formed in the housing halves 14 and 16. As shown in FIG. 1, the optical cables 24 and 26 terminate at their ends in the recesses 50 and 52 respectively, whereby they can receive light that is reflected from the mirror bar 48.

To provide the necessary light to the mirror 48, an optical cable 54 is provided, paired with the cables 24, 26 as seen in FIGS. 1 and 2. With the above arrangement, tilting either toward the left or toward the right of the joystick 10 will result in either upward or else downward movement of the ball 38 and mirror member 42, causing the reflective bar 48 to move either upward or downward in the slots 44 and 46. This will result in differential light intensities being reflected from the mirror bar 48 to the optical cables 24, 26, and such signals can be utilized by suitable known electronic equipment to operate equipment in either of opposite modes. It will be noted that the drive from the ball 12 to the mirror 42 is of a positive mechanical nature, giving for reliable transformation of tilt movements of the joy stick to the controlled equipment. Such movement can be considered as being in either "x" or "–x" directions.

Referring now again to the drawings, a like arrangement can be provided for "y" axis movements. The ball 12 can be provided with a second pin 56 on the end of which a ball 58 is provided, received in a suitable socket of a second slidably mounted mirror member 60 that is vertically movable in guide slots 62 of the housing 14, 16. The mirror 60 has a reflective band similar to the band 48 of the mirror member 42. The optical signal cables 28 and 30 open into recesses 64, together with a light-beam supplying cable 66 to provide an optical transformation of movements of the ball 58 along the "y" axis into light signals for the cables 28 and 30. The socket 61 of the mirror member 60 is not a true cylinder but instead is slightly elongated horizontally as shown to take care of the particular geometry of the joystick and associated parts, since the ball 58 requires some sidewise or horizontal movement due to the restraint placed on the joystick by the pin or shaft 32. Here again, however, a sturdy positive drive is still established from the joystick 10 to the mirror member 60, providing for great reliability in the responses to movement of the joystick.

Also, in accordance with the invention, the lower housing member 16 is provided with a conical opening 68 to accommodate the lower tip 70 of the joystick, such arrangement constituting a positive stop for the various tilting movements of the joy stick.

Another embodiment of the invention is illustrated in FIG. 7, which shows a fragmentary view of FIG. 2 but with a different configuration of mirror member. The mirror member 72 in FIG. 7 has an outwardly-extending rib 74 which carries the mirror surface on its right side as viewed in the figure. The housing 75 has an appropriate recess 76 to provide clearance for the rib 74, and fiber-optic cables 78, 80 and 82 enter the housing 75 from the right side thereof. The cables 78 and 80 carry the control signals or information, whereas the center cable 82 provides the light beam intended to strike the mirror surface on the rib 74. Upward and downward movements of the mirror member 72 will expose greater or lesser amounts of the mirror surface on the rib 74, for reflection to the cables 78 and 80, as with the previous embodiment of the invention.

The housing parts 14, 16 and 75 are preferably constituted of molded plastic, as is the knob 18 and collar 22. The joystick 10 is preferably formed of metal, such as brass or steel, as is the spring 20. The pins 32 and 56, with the balls 38 and 58 are preferably constituted of metal. The pivot ball 12 can be formed of either plastic or metal. The mirror members can be constituted of either plastic or metal.

It will now be seen from the above that I have provided an improved fiber optic control device of the type using a joy stick, which is extremely simple, requiring a minimum number of parts, is low in cost, easy to assemble and reliable in its operation. The device replaces more costly assemblies of fiber optic cables and joysticks, and has features that are not found in more costly devices.

Variations and modifications are possible within the scope of the appended claims, without departing from the spirit of the invention.

Each and every one of the appended claims defines an aspect of the invention which is separate and distinct from all others, and accordingly it is intended that each claim be treated in this manner when examined in the light of the prior art devices in any determination of novelty or validity.

What is claimed is:

1. A fiber optic control device comprising, in combination:

a) a joy stick, b) a housing, c) means mounting the joy stick for universal pivotal movement on the housing from an upright axis thereof, d) a mirror, e) means movably mounting the mirror on the housing, f) a mechanical driving connection between the joy stick and the mirror, for actuating the mirror in response to movement of the joy stick, g) cooperable movement-limiting means on said joy stick and housing, enabling said universal pivotal movement of the joy stick to be had while preventing its rotative movement about the longitudinal axis thereof, and h) fiber-optic light transmission means cooperable with the mirror and including a source of light adapted to direct a light beam against portions of said mirror, for providing output light signals which are a function of the virtual angular position of said joy stick.

2. A fiber optic control device as set forth in claim 1, wherein the driving connection between the joy stick and the mirror comprises a positive mechanical drive.

3. A fiber optic control device as set forth in claim 1, wherein the mirror is mounted for linear movement on the housing.

4. A fiber optic control device as set forth in claim 3, wherein the movement of the mirror is parallel to the upright axis of the joy stick.

5. A fiber optic control device as set forth in claim 1, wherein the driving connection between the joy stick and the mirror comprises a ball and socket.

6. A fiber optic control device as set forth in claim 1, wherein the means mounting the joy stick on the housing comprises a ball and socket.

7. A fiber optic control device as set forth in claim 1, wherein the movement-limiting means comprises a shaft carried by the joy stick, said driving connection between the joy stick and mirror also comprising the said shaft.

8. A fiber optic control device as set forth in claim 1, and further including:

a) a second mirror, b) means movably mounting said second mirror on the housing in a direction parallel to the movement of the first-mentioned mirror c) a driving connection between the joy stick and the second mirror, for actuating said second mirror in response to other movements of the joy stick, and d) fiber-optic light transmission means cooperable with said second mirror and including a second source of light adapted to direct a light beam against portions of said second mirror, for providing additional and independent output light signals which are a function of other virtual angular positions of said joy stick.

9. A fiber optic control device as set forth in claim 6, wherein:

a) the joy stick carries the said ball, b) said driving connection comprises a second ball rigid on the first-mentioned ball and disposed closely adjacent the surface of the latter ball.

10. A fiber optic control device as set forth in claim 9, wherein the means which comprises the driving connection between the joy stick and the mirror comprises a socket in the mirror, in which said second ball is slidably received.

11. A fiber optic control device as set forth in claim 10, wherein the mirror comprises a plate which has a reflective bar that extends across a part of the surface of the plate.

12. A fiber optic control device as set forth in claim 1, wherein the housing comprises a pair of superposed blocks having aligned tracking grooves in which the mirror is slidable.

13. A fiber optic control device as set forth in claim 12, wherein:

a) the lower one of the two blocks of the housing has a recess, b) said joy stick having a bottom extension which is disposed in said recess and which limits the pivotal movement of the stick.

14. A fiber optic control device as set forth in claim 5, wherein the socket of the driving connection is carried by the mirror and is circular.

15. A fiber optic control device as set forth in claim 5, wherein the ball is carried by the joy stick and the socket is in the mirror.

16. A fiber optic control device as set forth in claim 8, wherein said second mirror faces in the same direction as said first-named mirror.

17. A fiber optic control device as set forth in claim 8, wherein:

a) the driving connection between the joy stick and the mirror comprises a ball and socket.

b) said second mirror member comprising a plate having the said socket in one of its sides, c) the other side of said plate having a projecting rib on which the mirror surface is mounted.

* * * * *